United States Patent

La Barbera

[15] 3,692,916

[45] Sept. 19, 1972

[54] COMPOSITION AND METHOD FOR INHIBITING GROWTH OF PLANT PATHOGENS

[72] Inventor: Robert R. La Barbera, Vallodolid, Spain

[73] Assignee: Wm. T. Thompson Co., Wilmington, Calif.

[22] Filed: July 6, 1970

[21] Appl. No.: 52,746

[52] U.S. Cl.....................................424/346, 424/347

[51] Int. Cl.................................................A01n 9/26

[58] Field of Search.......................424/346, 347, 337

[56] References Cited

OTHER PUBLICATIONS

Golden et al. – J. Am. Chem. Soc. (Sci. Ed.) 36, 359–362 (1947)

Keil – Agricultural Chemicals 20(4) 23, 24 & 128 (1965)

*Primary Examiner*—Albert T. Meyers
*Assistant Examiner*—Leonard Schenkman
*Attorney*—Fulwider, Patton, Rieber, Lee & Utecht

[57] ABSTRACT

The disclosure describes a composition and method for inhibiting the growth of plant fungi by treating such plant fungi with a fungus-inhibiting amount of a composition including both thymol and chlorothymol.

11 Claims, No Drawings

COMPOSITION AND METHOD FOR INHIBITING GROWTH OF PLANT PATHOGENS

BACKGROUND OF THE INVENTION

The present invention relates to a composition and method for inhibiting the growth of plant fungi. More particularly, the invention relates to a composition including both thymol and chlorothymol which synergistically inhibits the growth of plant fungi.

It is known that various plant fungi tend to destroy trees, crops, shrubbery and various types of plants, both harvest producing and decorative or ornamental. The diseases caused by such fungi have been tremendously destructive to various types of plants and each year cause damage in the millions of dollars. For example, C. ulmi, the cause of the commonly known Dutch elm disease, has each year taken a heavy toll of native and European elm trees. *Verticillium alboatrum* causes various types of wilt in trees, such as maple and elm trees and also plants such as cotton. In addition to cotton wilt, Verticillium is pathogenic to avocado, blackberry, cabbage, grapes, peppermint, potatoes, raspberry, sugar beets, tomatoes and causes spot disease of mushrooms. Cercospora causes severe leaf blight of evergreen plants and leaf spot of the higher woody plants. Various forms of Cercospora, such as *Cercospora apii*, causes early blight of celery and can be sufficient in intensity to kill the plant. *Cercospora musae*, also known as banana signatoka, causes leaf disease in bananas. *Cercospora arachidicola* causes leaf spots of peanuts, and it is generally regarded as the most destructive plant disease of this crop. *Cercospora beticola* causes leaf spot of sugar beets and is particularly destructive in Europe and east of the Continental Divide in the United States.

In Bulletin 498 of the Connecticut Agricultural Experiment Station, entitled "Dutch Elm Disease and Its Chemotherapy," July, 1946, there is disclosed at pages 44 and 45 that of some 100 chemicals tested as fungistatic agents against C. ulmi at 1000 ppm. thymol was one of the 57 chemicals which manifested at least a 25 percent growth reduction. The present invention, on the other hand, is directed to an admixture of thymol and chlorothymol which has demonstrated synergistic fungistatic effects on a number of plant fungi as well as C. ulmi.

SUMMARY OF THE INVENTION

It has now been discovered that the growth of various plant fungi may be inhibited by treating said fungi with a fungus-inhibiting amount of a composition including thymol and chlorothymol. For the purposes of this invention the term "fungus-inhibiting" includes fungistatic and/or fungicidal effects.

The amount of the thymol-chlorothymol composition which is growth inhibiting varies with the plant pathogen whose growth is to be inhibited and ranges upward from about 15 ppm. Examples of typical growth inhibiting amounts may be found below in the examples.

The ratio of thymol to chlorothymol in the composition may vary from about 3:1 parts thymol to chlorothymol to about 3:1 parts chlorothymol to thymol. Maximum synergistic growth inhibition occurs when the composition contains about the same amounts of both thymol and chlorothymol.

The composition may also include inert materials such as carriers, dispersants and emulsifiers. For example, dimethyl sulfoxide (DMSO) has been found to be an effective carrier for the admixture of this invention. An aqueous dispersion of between about 5-90% DMSO, the balance being thymol and chlorothymol (within the ranges of thymol to chlorothymol, heretofore specified), together with an inert organic solvent system for solubilizing the thymol and chlorothymol, and a suitable wetting agent has proven effective in controlling plant fungi.

Any conventional non-ionic or anionic wetting agent may be used. Suitable wetting agents include alkylarylsulfonates (Nacconol SW, Lanitol) N-methyl-N-oleyl taurate (Conogel), the reaction product of an alkylated phenol and ethylene oxide (Energetic W–100) polyethylene glycol mono-stearate, and sodium tetradecyl sulfate (Tergitol NPX). Cationic emulsifiers form insoluble salts with thymol in hard water and for this reason should be avoided. The wetting agents provide emulsification or dispersion of the ingredients of the inhibitor composition when diluted with water at the site of application.

Dimethyl sulfoxide may be used in combination with the non-ionic and anionic wetting agents.

Any inert solvent system capable of solubilizing thymol and chlorothymol may be used. Examples of suitable inert solvents or solvent systems include one or more of the following: xylene, methanol, cyclohexane, ethanol, isopropyl alcohol, etc. There is no critical balance of active ingredients to solvents and emulsifiers other than the minimum requirements of solubility and that amount of emulsifier necessary to promote adequate emulsification at the desired aqueous dilution. Examples of suitable formulations are shown in the EXAMPLES given below.

In addition to the surfactants described above, it has been found that small quantities of trace elements in the form of soluble metal salts such as zinc chloride may be added to the admixture. While the trace elements themselves have no fungusinhibiting effect, they may supply needed trace elements for general vigor, etc.

It is not understood why the admixture of chlorothymol and thymol is synergistic. It is an unexpected phenomenon, and was discovered only furtuitously.

To further illustrate the manner in which the invention may be carried out, the following additional examples are given.

EXAMPLE I

The following plant fungi, *Macrophominia*, *C. beticola*, *F. oxysporum* and *V. alboatrum*, were used to test the effectiveness as a fungus-inhibitor of thymol, chorothymol and a 50 percent thymol/50 percent chlorothymol admixture. All tests were carried out in triplicate on two separate occasions. The testing method utilized was the tube dilution method with Sabouraud's broth as the growth medium.

A solution was prepared by adding 1 part thymol and 1 part chlorothymol to 20 parts ethanol and diluted with growth medium as necessary for the appropriate concentration.

In every case, a control was simultaneously run using the same volume of ethanol without fungicide. Viability is denoted as positive (+) and non-viability is noted as negative (−). All controls were (+).

TABLE 1

(a) *Macrophominia*

| parts per million | 500 | 250 | 125 | 62 | 31 |
|---|---|---|---|---|---|
| Thymol | − | − | − | + | + |
| Chlorothymol | − | − | − | + | + |
| 50% Thymol + 50% Chlorothymol | − | − | − | − | + |

(b) *C. beticola*

| parts per million | 500 | 250 | 125 | 62 | 31 |
|---|---|---|---|---|---|
| Thymol | − | + | + | + | + |
| Chlorothymol | − | − | − | + | + |
| 50% Thymol + 50% Chlorothymol | − | − | − | − | + |

(c) *F. oxysporum*

| parts per million | 500 | 250 | 125 | 62 | 31 |
|---|---|---|---|---|---|
| Thymol | − | + | + | + | + |
| Chlorothymol | − | − | − | + | + |
| 50% Thymol + 50% Chlorothymol | − | − | − | − | + |

(d) *V. alboatrum*

| parts per million | 500 | 250 | 125 | 62 | 31 |
|---|---|---|---|---|---|
| Thymol | + | + | + | + | + |
| Chlorothymol | − | + | + | + | + |
| 50% Thymol + 50% Chlorothymol | − | − | + | + | + |

Table 1 indicates the effectiveness of an admixture of thymol and chlorothymol as a synergistic growth inhibiting agent. Thus, in Table 1, (a), 62 ppm of either thymol or chlorothymol were not effective fungicidal agents, but 31 ppm of thymol in admixture with 31 ppm of chlorothymol (making a total of 62 ppm) was fungicidal. The same synergism is noted in Table 1, (b), and Table 1, (c). Synergism is also present in Table 1, (d), but at a higher concentration.

EXAMPLE II

The following plant fungi, *C. ulmi*, *G. zeae*, *A. niger*, *R. salani*, *F. oxysporum*, *F. vasinfectum*, and *Pythium* were used to test the effectiveness of thymol, chlorothymol and a 50 percent thymol/50 chlorothymol admixture as a growth inhibitor. The solutions for testing were prepared as indicated in EXAMPLE I. All levels of fungicide were tested in triplicate.

The controls consisted of six inoculated plates containing no fungicide. The inoculum consisted of 3 mm. disks of agar culture of the test organism. Each disk was placed in the center of the plate and growth was permitted to radiate across the surface. The growth radius on the fungicide-treated plates was compared with that on the control plates. Elm extract sugar was used in the study for *C. ulmi* at pH 5.5. Mycological agar at pH 5.5 was used in the study of *A. niger* and the rest of the fungi were studied on plain agar medium containing no added nutrients.

When the fungicide treated plates showed no growth or retarded growth the inoculum disk was transferred to Sabouraud's broth to determine viability.

Table 2 below tabulates the results of testing in EXAMPLE II.

TABLE 2

(a) *C. ulmi*

| Fungicide | Parts/million | Growth Radius in mm. | Viability |
|---|---|---|---|
| Controls | 0 | 45,44,45,45,45,45 | + |
| Thymol | 125 | 0,0,0 | + |
| | 62 | 10,10,9 | + |
| | 31 | 20,20,22 | + |
| | 15 | 35,35,35 | + |
| | 7.5 | 45,45,45 | + |
| Chlorothymol | 125 | 0,0,0 | − |
| | 62 | 0,0,0 | + |
| | 31 | 10,10,9 | + |
| | 15 | 35,36,38 | + |
| | 7.5 | 45,45,45 | + |
| 50% Thymol + 50% Chlorothymol | 125 | 0,0,0 | − |
| | 62 | 5,6,6 | + |
| | 31 | 13,14,14 | + |
| | 15 | 35,35,35 | + |
| | 7.5 | 45,45,45 | + |

(b) *G. zeae*

| Fungicide | Parts/million | Growth Radius in mm. | Viability |
|---|---|---|---|
| Controls | 0 | 43,45,45,45,45,45 | + |
| Thymol | 125 | 0,0,0 | + |
| | 62 | 6,9,9 | + |
| | 31 | 17,19,19 | + |
| | 15 | 26,26,27 | + |
| Chlorothymol | 125 | 0,0,0 | − |
| | 62 | 0,0,0 | + |
| | 31 | 0,0,0 | + |
| | 15 | 6,6,5 | + |
| 50% Thymol + 50% Chlorothymol | 125 | 0,0,0 | − |
| | 62 | 0,0,0 | + |
| | 31 | 0,0,0 | + |
| | 15 | 8,10,10 | + |

(c) *A. niger*

| Fungicide | Parts/million | Growth Radius in mm. | Viability |
|---|---|---|---|
| Controls | 0 | 45,45,45,45,45,45 | + |
| Thymol | 125 | 0,0,0 | + |
| | 62 | 17,18,18 | + |
| | 31 | 22,23,21 | + |
| | 15 | 30,30,29 | + |
| Chlorothymol | 125 | 0,0,0 | − |
| | 62 | 0,0,0 | + |
| | 31 | 6,6,7 | + |
| | 15 | 17,17,18 | + |
| 50% Thymol + 50% Chlorothymol | 125 | 0,0,0 | + |
| | 62 | 0,0,0 | + |
| | 31 | 17,17,16 | + |
| | 15 | 25,24,25 | + |

(d) *R. salani*

| Fungicide | Parts/million | Growth Radius in mm. | Viability |
|---|---|---|---|

| | | | |
|---|---|---|---|
| Controls | 0 | 45,45,45,45,45,45 | + |
| Thymol | 125 | 0,0,0 | + |
| | 62 | 0,0,0 | + |
| | 31 | 13,12,13 | + |
| | 15 | 30,31,31 | + |
| Thymol | 125 | 0,0,0 | + |
| | 62 | 0,0,0 | + |
| | 31 | 13,12,13 | + |
| | 15 | 30,31,31 | + |
| Chlorothymol | 125 | 0,0,0 | – |
| | 62 | 0,0,0 | + |
| | 31 | 6,6,7 | + |
| | 15 | 10,12,11 | + |
| 50% Thymol + 50% Chloro- | 125 | 0,0,0 | – |
| thymol 62 | | 0,0,0 | + |
| | 31 | 3,4,4 | + |
| | 15 | 10,9,11 | + |

(e) *F. oxysporum*

| Fungicide | Parts/million | Growth Radius in mm. | Viability |
|---|---|---|---|
| Controls | 0 | 45,45,45,45,45,45 | + |
| Thymol | 125 | 0,0,0 | + |
| | 62 | 4,4,5 | + |
| | 31 | 22,22,22 | + |
| | 15 | 45,45,45 | + |
| Chlorothymol | 125 | 0,0,0 | – |
| | 62 | 0,0,0 | + |
| | 31 | 1,1,1 | + |
| | 15 | 9,9,8 | + |
| 50% Thymol + 50% Chloro- | 125 | 0,0,0 | – |
| thymol | 62 | 0,0,0 | + |
| | 31 | 3,3,4 | + |
| | 15 | 13,14,14 | + |

(f) vasinfectum

| Fungicide | Parts/million | Growth Radius in mm. | Viability |
|---|---|---|---|
| Controls | 0 | 45,45,45,45,45,45 | + |
| Thymol | 125 | 0,0,0 | – |
| | 62 | 2,2,2 | + |
| | 31 | 10,9,10 | + |
| | 15 | 22,23,22 | + |
| Chlorothymol | 125 | 0,0,0 | – |
| | 62 | 0,0,0 | – |
| | 31 | 0,0,0 | + |
| | 15 | 4,4,4 | + |
| 50% Thymol + 50% Chloro- | 125 | 0,0,0 | – |
| thymol | 62 | 0,0,0 | + |
| | 31 | 2,2,2 | + |
| | 15 | 11,10,10 | + |

(g) *Pythium*

| Fungicide | Parts/million | Growth Radius in mm. | Viability |
|---|---|---|---|
| Controls | 0 | 45,45,45,45,45,45 | + |
| Thymol | 125 | 0,0,0 | + |
| | 62 | 0,0,0 | + |
| | 31 | 9,9,9 | 30 |
| | 15 | 29,30,30 | + |
| Chlorothymol | 125 | 0,0,0 | – |
| | 62 | 0,0,0 | + |
| | 31 | 0,0,0 | + |
| | 15 | 1,1,2 | + |
| 50% Thymol + 50% Chloro- | 125 | 0,0,0 | + |
| thymol | 62 | 0,0,0 | |
| | 31 | 0,0,0 | + |
| | 15 | 3,4,4 | + |

Table 2 indicates the effectiveness of an admixture of thymol and chlorothymol as a synergistic growth inhibiting agent. Thus, in Table 2, (a), it will be noted that 15 ppm of thymol, alone, inhibit growth of *C. ulmi* to the extent of 35 mm., and 15 ppm of chlorothymol, alone, inhibits growth to the extent of 35 mm. One would expect that combining about 15 ppm of each of thymol and chlorothymol, one would inhibit growth of the 35 mm. level. Yet, the results of the combination of 15.5 ppm of each (i. e. 31 ppm total) indicates a growth inhibition to about 13–14 mm. Similar results were found with the other plant fungi in Table 2, (b) through (g).

EXAMPLE III.

EXAMPLE II was repeated, except that aqueous dispersions of the following formulations were substituted for the fungicide compositions shown in EXAMPLE II.

| | | |
|---|---|---|
| (1) | Chlorothymol | 7% |
| | Thymol | 7% |
| | Methanol | 15% |
| | Xylene | 42% |
| | an alkylarysulfonate (Lanitol) | 26% |
| | $ZnCl_2$ | 3% |
| (2) | Chlorothymol | 7% |
| | Thymol | 7% |
| | Methanol | 15% |
| | DMSO | 40% |
| | an alkylarysulfonate (Nacconol SW) | 28% |
| | $ZnCl_2$ | 3% |

Similar results were achieved.

EXAMPLES IV and V.

EXAMPLE II is repeated, except that the 50 percent thymol-50 percent chlorothymol solution is replaced with a solution containing 75 percent thymol and 25 percent chlorothymol (EXAMPLE IV) and a solution containing 25 percent thymol and 75 percent chlorothymol (EXAMPLE V). Similar results are achieved.

What is claimed is:

1. A composition for inhibiting the growth of plant fungi comprising a fungus-inhibiting amount of a composition of about equal amounts of thymol and chlorothymol.

2. The composition of claim 1 also comprising on inert material selected from the group consisting of carrier, a non-ionic surface active agent, an anionic surface active agent and mixtures thereof.

3. The composition of claim 2 also comprising an inert solvent capable of solubilizing nymol and chlorothymol.

4. A composition for inhibiting the growth of plant fungi comprising a fungus-inhibiting amount of a solution of about 7 percent thymol and about 7 percent chlorothymol in about 15 percent of an inert organic solvent, said solvent being capable of solubilizing thymol and chlorothymol, and about 71 percent of an inert material selected from the group consisting of dimethyl sulfoxide, on anionic surface active agent, a non-ionic surface active agent and mixtures thereof.

5. The composition of claim 4 in the form of an aqueous dispersion.

6. A method for inhibiting the growth of plant fungi comprising contacting the fungi with a fungus inhibiting amount of a composition of about equal amounts of thymol and chlorothymol.

7. The method of claim 6 wherein the plant fungi are selected from the group consisting of *Macrophominia*, *C. beticola*, *F*, *oxysporum*, *V. alboatrum*, *C. ulmi*, *G. Zeae*, *A*, *niger R. saldni*, *F. vasinfectum* and *Pythium*.

8. The method of claim 6 wherein the composition also comprises an inert material selected from the group consisting of a carrier, a non-ionic surface active agent, an anionic surface active agent and mixtures thereof.

9. The method of claim 8 wherein the composition also comprises an inert solvent capable of solubilizing thymol and chlorothymol.

10. A method for inhibiting the growth of plant fungi comprising contacting the fungi with a fungus inhibiting amount of a solution of about 7 percent thymol and about 7 percent chlorothymol in about 15 percent of an inert organic solvent, said solvent being capable of solubilizing thymol and chlorothymol and about 71 percent of an inert material selected from the group consisting of dimethyl sulfoxide, an anionic surface active agent, a non-ionic surface active agent and mixtures thereof.

11. The method of claim 10 wherein the solution is in the form of a aqueous dispersion.

* * * * *